United States Patent
Tang et al.

(10) Patent No.: US 8,781,332 B2
(45) Date of Patent: Jul. 15, 2014

(54) OPTICAL TRANSCEIVER MODULE, OPTICAL TRANSMISSION DEVICE, AND OPTICAL TRANSMISSION METHOD

(75) Inventors: Jin-Kuan Tang, Beijing (CN); Jiin Lai, New Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 680 days.

(21) Appl. No.: 13/018,548

(22) Filed: Feb. 1, 2011

(65) Prior Publication Data

US 2012/0106949 A1 May 3, 2012

(30) Foreign Application Priority Data

Oct. 28, 2010 (CN) ............ 2010 1 0523111

(51) Int. Cl.
*H04B 10/00* (2013.01)
(52) U.S. Cl.
USPC ........... 398/135; 398/136; 398/22; 398/23; 398/164; 398/15; 385/88; 385/89; 385/92; 385/93

(58) Field of Classification Search
USPC ......... 398/135, 136, 137, 138, 141, 158, 159, 398/33, 22, 25, 164, 15, 17, 23, 24; 385/88, 385/89, 90, 92, 93
See application file for complete search history.

(56) References Cited

U.S. PATENT DOCUMENTS 7,296,936 B2 * 11/2007 Crews .................. 385/88
8,098,993 B2 * 1/2012 Kirkpatrick et al. ...... 398/135

FOREIGN PATENT DOCUMENTS

| CN | 1661815 A | 8/2005 |
|---|---|---|
| CN | 1680902 A | 10/2005 |
| WO | 2009/137418 A1 | 11/2009 |

OTHER PUBLICATIONS

English translation of abstract of CN 1661815 A (published Aug. 31, 2005).
English translation of abstract of CN 1680902 A (published Oct. 12, 2005).

* cited by examiner

*Primary Examiner* — Hanh Phan
(74) *Attorney, Agent, or Firm* — McClure, Qualey & Rodack, LLP

(57) ABSTRACT

An optical transceiver module adapted to a link device includes a connection unit, a driving unit and optical transmitting and receiving units. The connection unit, to be coupled with the link device, includes an indicating element for generating an indicating signal when the connection unit is coupled with the link device. The driving unit, coupled with the connection unit, receives the indicating signal and outputs a control signal according to the indicating signal. The optical transmitting unit, coupled with the driving unit, receives the control signal for driving the optical transmitting unit to output a first optical signal. The optical receiving unit, coupled with the driving unit, transmits a received second optical signal to the driving unit. An optical transmission device using the optical transceiver module, and an optical transmission method are also disclosed. A link training sequence can be initiated after the connection unit is actually coupled with the link device. Thus, a host cannot enter a disable mode due to error connection.

15 Claims, 6 Drawing Sheets

OPTICAL TRANSCEIVER MODULE, OPTICAL TRANSMISSION DEVICE, AND OPTICAL TRANSMISSION METHOD

CROSS REFERENCE TO RELATED APPLICATIONS

This Non-provisional application claims priority under 35 U.S.C. §119(a) on Patent Application No(s). 201010523111.2 filed in People's Republic of China on Oct. 28, 2010, the entire contents of which are hereby incorporated by reference.

BACKGROUND OF THE INVENTION

1. Field of Invention

The invention relates to an optical transceiver module and, in particular, to an optical transceiver module adapted to a universal serial bus (USB).

2. Related Art

With the development of the optical transmission technology, the advantages of the optical fiber transmission in the transmission bandwidth, the transmission distance and the anti-interference ability make an optical transceiver module be applied more and more widely. Due to the advantages of the optical transmission technology, more and more applications are desired to replace the conventional copper transmission cable with the optical transceiver module and the optical cable to couple the existing host to the existing device, such that the host with the conventional interface specification, such as the peripheral component interconnect express (PCIE) interconnection standard interface specification or the USB version 3.0 (USB 3.0) interface specification, can perform the optical fiber communication with the device through the optical transceiver module.

Therefore, it is an important subject to provide an optical transceiver module, an optical transmission device and an optical transmission method suitable for optical fiber communication between the host and device.

SUMMARY OF THE INVENTION

In view of the foregoing, the invention provides an optical transceiver module, an optical transmission device and an optical transmission method suitable for optical fiber communication between the host and device.

The invention discloses an optical transceiver module adapted to a link device. The optical transceiver module includes a connection unit, a driving unit, an optical transmitting unit and an optical receiving unit. The connection unit to be coupled with the link device includes an indicating element. When the connection unit is coupled with the link device, the indicating element generates an indicating signal. The driving unit, coupled with connection unit, receives the indicating signal and outputs a control signal according to the indicating signal. The optical transmitting unit, coupled with the driving unit, receives the control signal. The control signal drives the optical transmitting unit to output a first optical signal. The optical receiving unit, coupled with the driving unit, transmits a received second optical signal to the driving unit.

The invention also discloses an optical transmission device adapted to a first link device and a second link device. The optical transmission device includes a first optical transceiver module and a second optical transceiver module. The first optical transceiver module is coupled to one end of an optical fiber and includes a first connection unit, a first driving unit, a first optical transmitting unit and a first optical receiving unit. The first connection unit is to be coupled with the first link device, the first driving unit drives the first optical transmitting unit and the first optical receiving unit to output and receive optical signals through the optical fiber. The second optical transceiver module is coupled to the other end of the optical fiber and includes a second connection unit, a second driving unit, a second optical transmitting unit, and a second optical receiving unit. The second connection unit is to be coupled with the second link device and includes an indicating element, which generates an indicating signal when the second connection unit is coupled with the second link device. The second driving unit is coupled with the second connection unit for receiving the indicating signal and outputting a control signal according to the indicating signal. The second optical transmitting unit is coupled with the second driving unit for receiving the control signal, which drives the second optical transmitting unit to output a first optical signal through the optical fiber. The second optical receiving unit is coupled with the second driving unit for transmitting a second optical signal, which is received through the optical fiber, to the second driving unit.

The invention further discloses an optical transmission method applied to an optical transmission device and adapted to a first link device and a second link device. The optical transmission device includes an optical fiber, a first optical transceiver module and a second optical transceiver module. The first optical transceiver module is coupled to the second optical transceiver module through the optical fiber. The second optical transceiver module includes a second connection unit, a second driving unit, a second optical transmitting unit and a second optical receiving unit, and the second connection unit includes an indicating element. The optical transmission method includes the following steps of: providing a power to the second optical transceiver module; generating, by the indicating element, an indicating signal to the second driving unit when the second connection unit is coupled with the second link device; and outputting, by the second driving unit, a control signal through the optical fiber according to the indicating signal to drive the second optical transmitting unit to output a first optical signal to the first optical transceiver module.

As mentioned above, in the optical transceiver module, the optical transmission device and the optical transmission method according to the invention, the indicating element is added to the connection unit to determine whether the connection unit is coupled with the second link device (e.g., USB). When the connection unit is coupled with the second link device, the indicating element generates the indicating signal, such that the driving unit outputs the control signal and drives the optical transmitting unit to output the first optical signal. When the connection unit is not coupled with the second link device, the indicating element does not generate the indicating signal, the driving unit stops outputting the control signal, and the optical transmitting unit also stops outputting the first optical signal. Thus, it is possible to decide whether the first optical signal is to be outputted after verifying whether the connection unit is coupled with the second link device. Then, the subsequent optical transmission method step is utilized to finish the data transmission between the first link device (e.g., the host) and the second link device. Thus, it is possible to prevent the host from performing the link training sequence due to misjudgment and thus to prevent the host from entering the disable mode when the device is not coupled to the device-end optical transceiver module.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
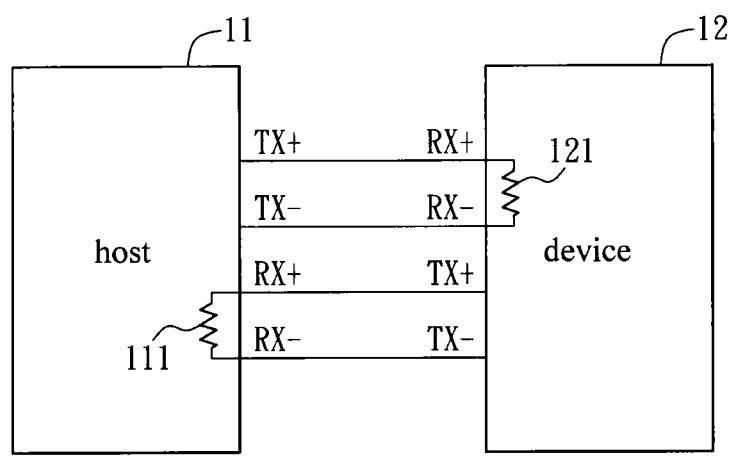
FIG. 1 is a block diagram showing data transmission between a host and an device.

FIG. 1 is a block diagram showing data transmission between a host 11 and a device 12. The host 11 may be an express electronic transceiver supporting the hot plug function and having the PCIE interconnection standard interface specification or the USB version 3.0 (USB 3.0) interface specification. The host 11 polls whether the device 12 is inserted every period of time. When the inserted device 12 is detected, the host 11 issues a link training sequence to create a link with the device 12. Meanwhile, the device 12 also polls whether the host exists every period of time. When the host 11 is detected, the device 12 also issues a link training sequence to create a link with the host 11.

The positive signal transmitting end TX+ and the negative signal transmitting end TX− of the host 11 are coupled to the positive signal receiving end RX+ and the negative signal receiving end RX− of the device 12 so that the host 11 can transmit data to the device 12 in the form of, for example, a differential signal pair. The positive signal receiving end RX+ and the negative signal receiving end RX− of the host 11 are coupled to the positive signal transmitting end TX+ and the negative signal transmitting end TX− of the device 12 so that the device 12 can transmit data to the host 11 in the form of the differential signal pair. The host 11 polls whether a differential terminal impedance exists between its positive signal transmitting end TX+ and its negative signal transmitting end TX− to determine whether the device 12 is inserted. As shown in FIG. 1, when the device 12 is coupled to the host 11 and gets ready, a differential terminal impedance 121 exists between the positive signal receiving end RX+ and the negative signal receiving end RX− of the device 12. The positive signal receiving end RX+ and the negative signal receiving end RX− of the device 12 couple a resistor to a ground to implement the differential terminal impedance 121. When the host 11 detects the presence of the differential terminal impedance 121 between the positive signal transmitting end TX+ and the negative signal transmitting end TX−, that is, when the host 11 detects the presence of the differential terminal impedance 121, the host 11 deems that the device 12 is inserted, so the host 11 issues the transmission of the link training sequence. Similarly, device 12 also polls and detects whether a differential terminal impedance 111 exists between its positive signal transmitting end TX+ and its negative signal transmitting end TX− to determine whether the device 12 is coupled with the host 11. The positive signal receiving end RX+ and the negative signal receiving end RX− of the host 11 couple a resistor to a ground to implement the differential terminal impedance 111. When the device 12 detects that the differential terminal impedance 111 exists between its positive signal transmitting end TX+ and its negative signal transmitting end TX−, the device 12 also outputs a response signal to the host 11. When the host 11 receives the response signal, the link training sequence is successfully created. So, the normal link between the host and the device 12 is completed to perform the data transmission.

Figure 2:
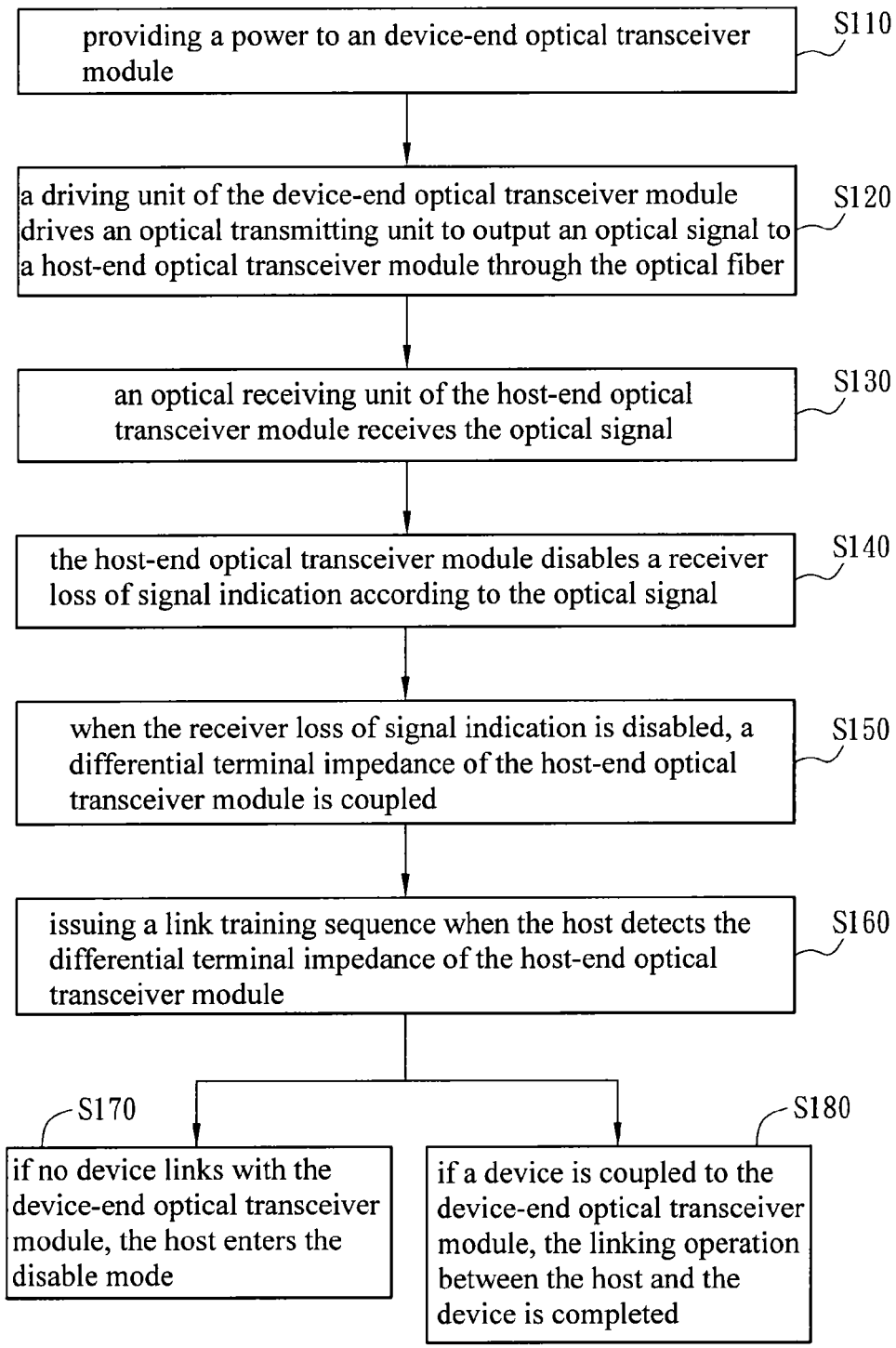
FIG. 2 is a flow chart showing a data transmission method between the host and the device.

In the optical transmission system, however, the copper cable between the host and the device has been developed to be replaced by a host-end transceiver module, an optical fiber and a device-end transceiver module, wherein the device-end transceiver module is coupled to the device through its connector. FIG. 2 is a flow chart showing a data transmission method between the host and the device. Referring to FIG. 2, the method includes the following steps. In step S110, a power is provided to a device-end optical transceiver module. In step S120, a driving unit of the device-end optical transceiver module drives an optical transmitting unit to output an optical signal to a host-end optical transceiver module through the optical fiber. In step S130, an optical receiving unit of the host-end optical transceiver module receives the optical signal. In step S140, the host-end optical transceiver module disables a receiver loss of signal indication according to the optical signal. In step S150, when the receiver loss of signal indication is disabled, a differential terminal impedance of the host-end optical transceiver module is coupled. In step S160, a link training sequence is issued when the host detects the differential terminal impedance of the host-end optical transceiver module. In step S170, if no device links with the device-end optical transceiver module, the host enters the disable mode. In addition, the linking operation between the host and a device is completed if the device is coupled to the device-end optical transceiver module, as shown in step S180.

The host-end optical transceiver module is powered by the host, while the device-end optical transceiver module is powered through the optical cable or by an external adaptor. When the host-end optical transceiver module has been coupled to the host but no device is coupled to the connector of the device-end transceiver module, the device-end optical transceiver module has been powered by the optical cable and is thus driven by performing the steps S110 to S170. When the host performs polling, it can detect the differential terminal impedance between the differential signal transmitting ends TX+ and TX−. Thus, the host may incorrectly determine that the device is inserted and thus issue the link training sequence to create the link with the device. At this time, however, no device is coupled to the device-end optical transceiver module through the connector at the other end of the optical cable. So, the host cannot receive any response and thus enters the disable mode. In order to remove this disable mode, the user usually has to perform the complicated settings or reboot the host, thereby causing inconvenience to the user.

Figure 3:
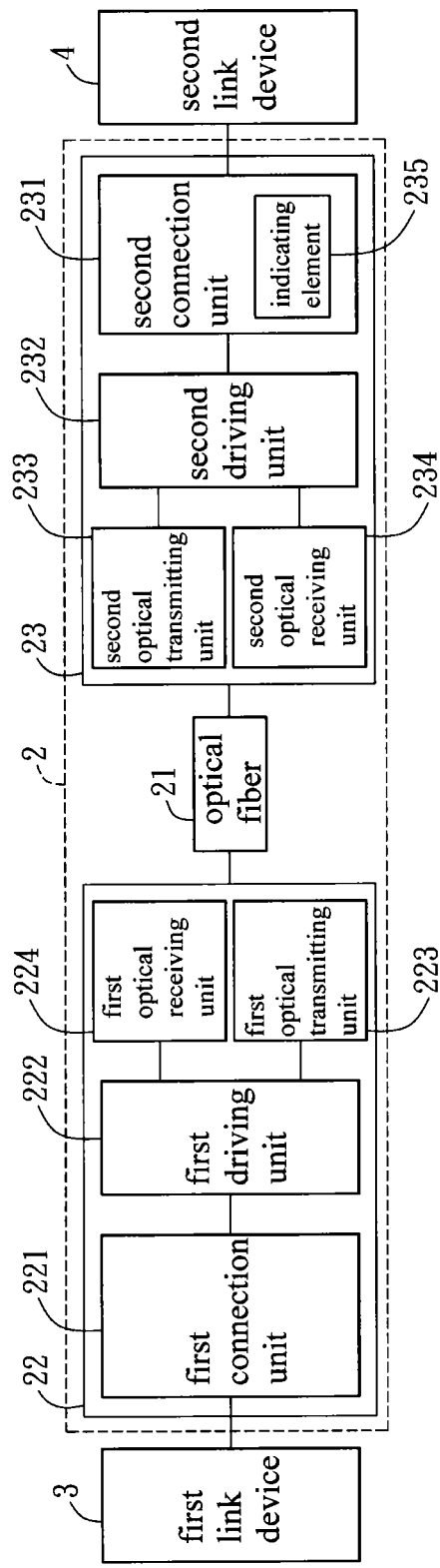
FIG. 3 is a block diagram showing an optical transmission device according to an embodiment of the invention.

FIG. 3 is a block diagram showing an optical transmission device according to an embodiment of the invention. Referring to FIG. 3, an optical transmission device 2 includes an optical fiber 21, a first optical transceiver module 22 and a second optical transceiver module 23. The first optical transceiver module 22 is coupled to one end of the optical fiber 21, while the second optical transceiver module 23 is coupled to the other end of the optical fiber 21.

The first optical transceiver module 22 includes a first connection unit 221, a first driving unit 222, a first optical transmitting unit 223 and a first optical receiving unit 224. The first connection unit 221 is to be coupled with a first link device 3. The first driving unit 222 drives the first optical transmitting unit 223 and the first optical receiving unit 224 to output and receive optical signals through the optical fiber 21. Herein, the first link device 3 is a host with a USB interface, the first optical transmitting unit 223 is a laser diode, and the first optical receiving unit 224 is a photo-detect diode.

Figure 4:
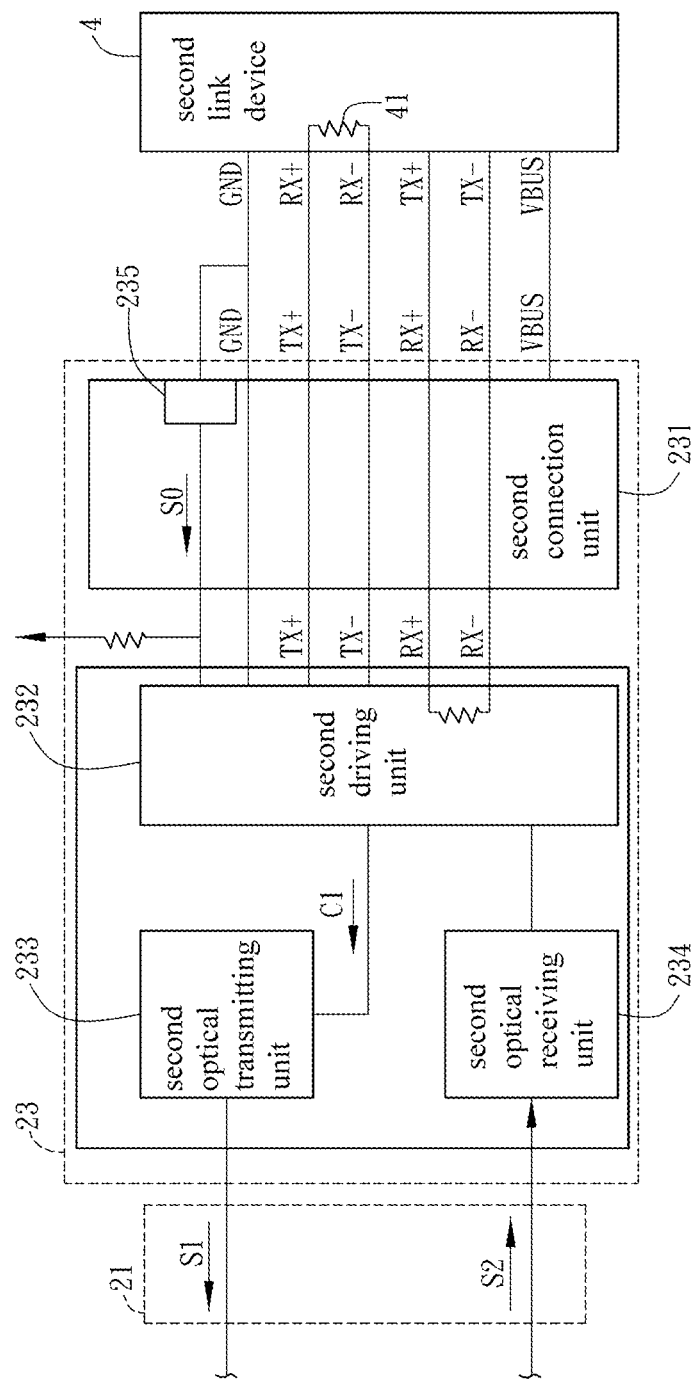
FIG. 4 is a schematic illustration showing a second optical transceiver module according to the embodiment of the invention.
Figure 6:
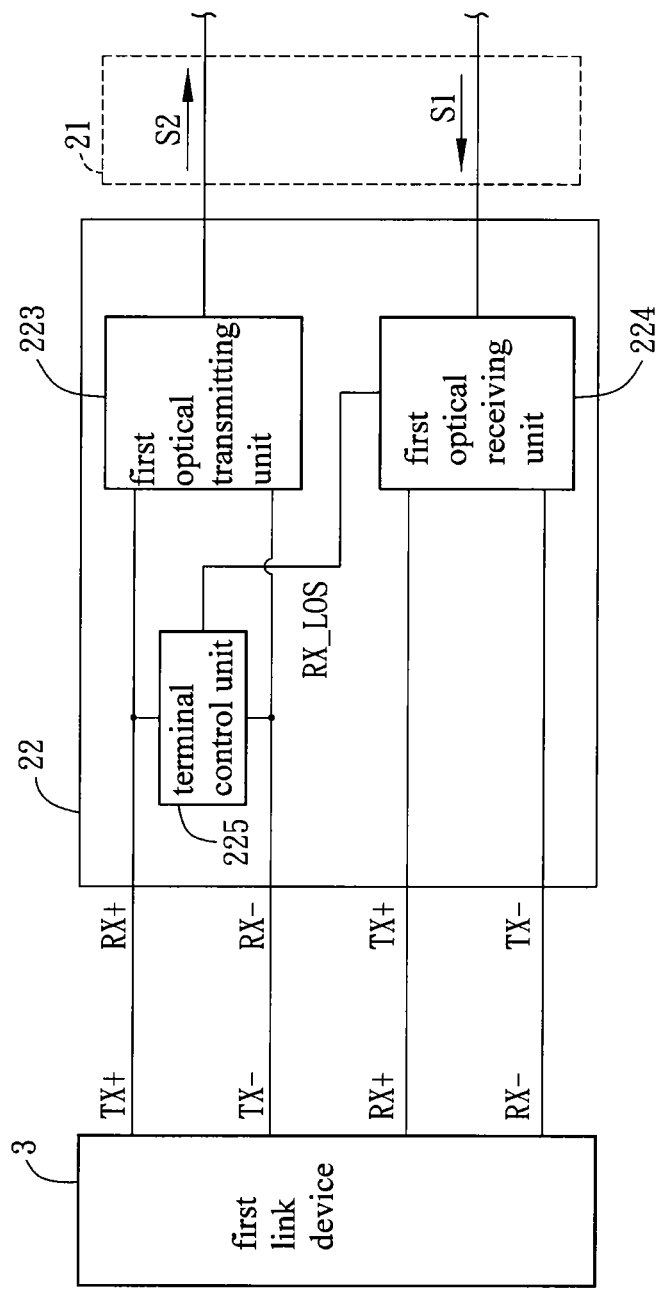
FIG. 6 is a partial block diagram showing an optical transmission device according to an embodiment of the invention.

FIG. 4 is a schematic illustration showing a second optical transceiver module according to the embodiment of the invention, and the portion of the first optical transceiver module is illustrated in FIG. 6 for the sake of simplicity. As shown in FIGS. 3 and 4, the second optical transceiver module 23 is adapted to a second link device 4 and is coupled to the optical fiber 21. The second optical transceiver module 23 includes a second connection unit 231, a second driving unit 232, a second optical transmitting unit 233 and a second optical receiving unit 234.

The second connection unit 231 is to be coupled with the second link device 4 and includes an indicating element 235. Herein, the second link device 4 is a USB device. When the second connection unit 231 is coupled with the second link device 4, the indicating element 235 generates an indicating signal S0. In one embodiment, the indicating signal S0 is outputted to the second driving unit 232 through a pin of the second connection unit 231.

In addition, when the second connection unit 231 is not coupled with the second link device 4, the indicating element 235 does not generate the indicating signal S0. Thus, the second driving unit 232 stops outputting a control signal C1, and the second optical transmitting unit 233 stops outputting a first optical signal S1.

As shown in FIG. 4, the second connection unit 231 of this embodiment includes a ground GND, a power supply source VBUS, differential signal transmitting ends TX+, TX−, differential signal receiving ends RX+, RX− and the indicating element 235. When the second connection unit 231 is not coupled with the second link device 4, the indicating signal S0 is at a first voltage level. When the indicating element 235 is coupled with the second link device 4, the indicating signal S0 is asserted to a second voltage level, wherein the second voltage level is different from the first voltage level. For example, a clip may be disposed in the indicating element 235. When the indicating element 235 is coupled with the second link device 4, the second link device 4 pushes the clip, such that the indicating element 235 is electrically coupled to the ground GND, and the indicating signal S0 is asserted to the low voltage level. Thus, it is possible to determine whether the indicating element 235 is coupled with the second link device 4 according to whether the indicating signal S0 is at the first voltage level or the second voltage level. Of course, the indicating element 235 may also utilize other means, such as a circuit switch, to control the outputted indicating signal S0. In this embodiment, before the second connection unit 231 is coupled to the second link device 4, the indicating element 235 is kept at the high voltage level. So, when the second driving unit 232 receives the high voltage level signal, it is determined that the indicating element 235 stops generating the indicating signal S0. When the second driving unit 232 receives the low voltage level signal, it is determined that the indicating element 235 generates the indicating signal S0. That is, the connection between the second connection unit 231 and the second link device 4 is finished.

The second driving unit 232, coupled with the second connection unit 231, receives the indicating signal S0 and outputs the control signal C1 according to the indicating signal S0. The second optical transmitting unit 233 is coupled with the second driving unit 232 to receive the control signal C1. The control signal C1 drives the second optical transmitting unit 233 to output the first optical signal S1 through the optical fiber 21. The second optical receiving unit 234 is coupled with the second driving unit 232, and transmits a second optical signal S2, received through the optical fiber 21, to a second driving unit 232. Herein, the second optical transmitting unit 233 is a laser diode, and the second optical receiving unit 234 is a photo-detect diode.

In addition, the positive signal receiving end RX+ and the negative signal receiving end RX− of the second link device 4 couple a resistor to a ground to implement a differential terminal impedance 41. Similarly, a differential terminal impedance (not shown) also exists between the positive signal receiving end and the negative signal receiving end of the first link device 3.

Referring to FIG. 6, in this embodiment, after the first optical receiving unit 224 receives the first optical signal S1, transmitted by the second optical transmitting unit 233 through the optical fiber 21, a receiver loss of signal indication (RX_LOS) is disabled. In general, the RX_LOS is usually in the enable state. Next, when the first optical receiving unit 224 receives the first optical signal S1, the RX_LOS turns into the disable state. When the RX_LOS is disabled, a differential terminal impedance of the first optical transceiver module 22 is coupled. For the sake of simplicity, FIG. 6 does not show the first connection unit 221, the first driving unit 222, the optical fiber 21 and the second optical transceiver module 23. In one embodiment, the first optical transceiver module 22 includes: the first optical receiving unit 224 for receiving the first optical signal S1, transmitted from the optical fiber 21, and outputting a disabled receiver loss of signal indication RX_LOS; the first optical transceiver module 22, which includes a positive signal receiving end and a negative signal receiving end for receiving the signal, which is outputted from the host and may be in the form of a differential signal pair; a terminal control unit 225, coupled between the positive signal receiving end RX+ and the negative signal receiving end RX−, for controlling the positive signal receiving end and the negative signal receiving end to be coupled with a differential terminal impedance or not according to the receiver loss of signal indication RX_LOS. To form the differential terminal impedance, for an example, the positive signal receiving end is coupled to a reference voltage level through a terminal impedance, and the negative signal receiving end is also coupled to the reference voltage level through a terminal impedance. The reference voltage level may be, for example, the ground. The terminal impedance may include a capacitor, a resistor, an inductor or the like. The terminal control unit 225 can receive the receiver loss of signal indication RX_LOS, and control whether a differential terminal impedance is coupled between the positive signal receiving end and the negative signal receiving end according to the receiver loss of signal indication RX_LOS. In this manner, the dynamic control can dynamically couple or cut off the differential terminal impedance between the positive signal receiving end and the negative signal receiving end of the first optical transceiver module 22, and whether the differential terminal impedance between the first optical transceiver module 22 and the first link device 3 is coupled therewith is determined by way of polling. In one embodiment, the differential terminal impedance may be disposed in the first driving unit 222, may be disposed in the first connection unit, or may be disposed in the first optical transceiver module 22. Next, when the first link device 3 detects the differential terminal impedance of the first optical transceiver module 22, a link training sequence is issued. Specifically speaking, because the first link device 3 polls whether the differential terminal impedance is detected or not, the link training sequence is issued to create the connection if the differential terminal impedance of the first optical transceiver module 22 is detected, so that the communication between the first link device 3 and the second link device 4 is finished through the optical transmission device 2. In addition, for the sake of simplifying the drawing, signal lines D+ and D− are not shown in FIG. 4, and the signal lines D+ and D− and a VBUS signal line are not shown in FIG. 6. In one embodiment, the first optical transceiver module and the second optical transceiver module may have the same configuration. Thus, the linking operation can be ensured when either the first link device or the second link device is inserted. That is, the first connection unit also includes an indicating element (not shown) for generating an indicating signal to the first driving unit, and the second optical transceiver module 23 also includes a receiver loss of signal indication RX_LOS for controlling whether a differential terminal impedance (not shown) is coupled between the positive signal receiving end and the negative signal receiving end of the second optical transceiver module 23.

Figure 5:
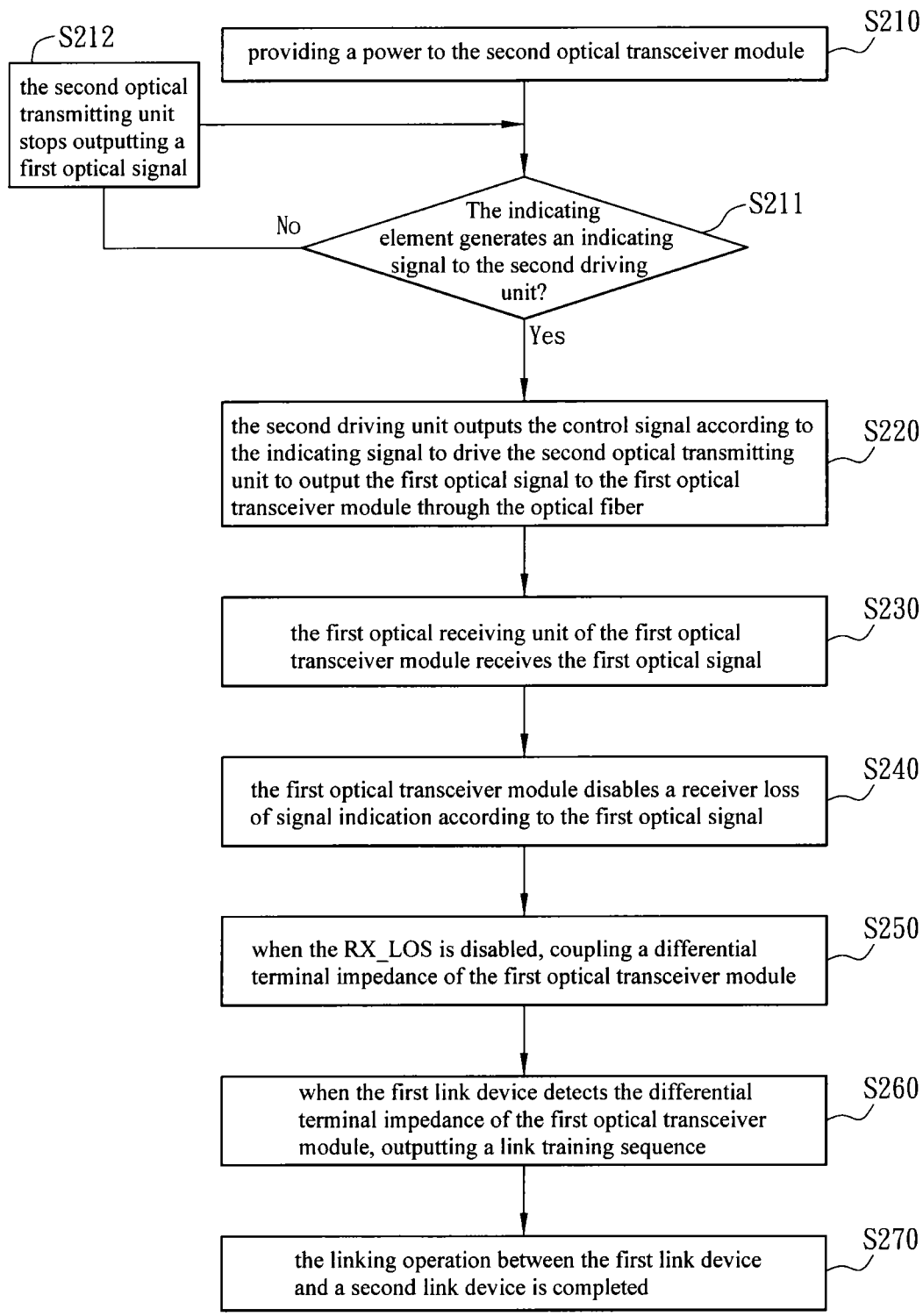
FIG. 5 is a flow chart showing an optical transmission method according to an embodiment of the invention.

FIG. 5 is a flow chart showing an optical transmission method according to an embodiment of the invention. As shown in FIG. 5, this method is applied to the optical transmission device 2 and adapted to the first link device 3 and the second link device 4, as shown in FIG. 3. The method includes the steps S210 to S270.

First, in the step S210, a power is provided to the second optical transceiver module. The power may be provided from the first link device 3 to the second optical transceiver module 23 through the optical fiber 21 or provided to the second optical transceiver module 23 directly through the external adaptor. In this embodiment, the power is provided to the second optical transceiver module 23 from the first link device 3 through the optical fiber 21.

Next, in the step S211, it is determined whether the indicating element 235 generates an indicating signal S0 to the second driving unit 232. In this embodiment, when the second connection unit 231 is not coupled with the second link device 4, the indicating element 235 outputs a high voltage level signal to the second driving unit 232. When the second driving unit 232 receives the high voltage level signal, the indicating element 235 is determined as stopping generating the indicating signal S0, so the step S212 is then performed. In addition, when the second connection unit 231 is coupled with the second link device 4, the indicating element 235 outputs a low voltage level signal to the second driving unit 232. When the second driving unit 232 receives the low voltage level signal, the indicating element 235 is determined as generating the indicating signal S0, and then the step S220 is performed.

In the step S212, the second optical transmitting unit 233 stops outputting a first optical signal S1. In this embodiment, the indicating signal S0 is kept at the high voltage level, so the second driving unit 232 cannot output a control signal C1. So, the second optical transmitting unit 233 cannot output the first optical signal S1, and the procedure goes back to the step S210.

Furthermore, in the step S220, the second driving unit 232 outputs the control signal C1 according to the indicating signal S0 to drive the second optical transmitting unit 233 to output the first optical signal S1 to the first optical transceiver module 22 through the optical fiber 21. In this embodiment, the second driving unit 232 is coupled with the second connection unit 231 to receive the indicating signal S0 (low voltage level signal), and to output a control signal C1 according to the indicating signal S0. The second optical transmitting unit 233 is coupled with the second driving unit 232 to receive the control signal C1, which drives the second optical transmitting unit 233 to output a first optical signal S1 to the first optical transceiver module 22 through the optical fiber 21.

In the step S230, the first optical receiving unit 224 of the first optical transceiver module 22 receives the first optical signal S1. In this embodiment, the first optical receiving unit 224 receives the first optical signal S1 transmitted through the optical fiber 21.

In the step S240, the first optical transceiver module 22 disables a receiver loss of signal indication according to the first optical signal S1. In this embodiment, the receiver loss of signal indication is generally in the enable state. When the first optical receiving unit 224 of the first optical transceiver module 22 receives the first optical signal S1, the RX_LOS is controlled to turn into the disable state, and then the step S250 is performed.

In the step S250, when the RX_LOS is disabled, a differential terminal impedance of the first optical transceiver module 22 is coupled. In this embodiment, a differential terminal impedance exists between the positive signal receiving end and the negative signal receiving end of the first optical transceiver module 22. When the RX_LOS is disabled, the positive signal receiving end and the negative signal receiving end of the first optical transceiver module 22 are coupled to the first link device 3 so as to couple the differential terminal impedance in the first optical transceiver module 22.

Next, in the step S260, when the first link device 3 detects the differential terminal impedance of the first optical transceiver module 22, the first link device 3 issues a link training sequence. In this embodiment, when the RX_LOS is disabled, the first link device 3 polls to detect whether the differential terminal impedance exists. If the differential terminal impedance of the first optical transceiver module 22 is detected, the first link device 3 issues the link training sequence to create the connection and thus the step S270 is completed, such that the first link device 3 communicates with the second link device 4 through the optical transmission device 2.

In summary, the indicating element is added to the connection unit to determine whether the connection unit is coupled with the second link device (e.g., USB) in the invention. When the connection unit is coupled with the second link device, the indicating element generates the indicating signal, such that the driving unit outputs the control signal and drives the optical transmitting unit to output the first optical signal. When the connection unit is not coupled with the second link device, the indicating element does not generate the indicating signal, the driving unit stops outputting the control signal, and the optical transmitting unit also stops outputting the first optical signal. Thus, it is possible to decide whether the first optical signal is to be outputted after verifying whether the connection unit is coupled with the second link device. Then, the subsequent optical transmission method step is utilized to finish the data transmission between the first link device (e.g., the host) and the second link device. Thus, it is possible to prevent the host from performing the link training sequence due to misjudgment and thus to prevent the host from entering the disable mode when the device is not coupled to the device-end optical transceiver module.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optical transceiver module adapted to a link device, the optical transceiver module comprising:
a connection unit to be coupled with the link device and having an indicating element for generating an indicating signal when the connection unit is coupled with the link device;
a driving unit, coupled with the connection unit, for receiving the indicating signal and outputting a control signal according to the indicating signal;
an optical transmitting unit, coupled with the driving unit, for receiving the control signal, which drives the optical transmitting unit to output a first optical signal; and
an optical receiving unit, coupled with the driving unit, for transmitting a received second optical signal to the driving unit.

2. The optical transceiver module according to claim 1, wherein when the connection unit is not coupled with the link device, the indicating element does not generate the indicating signal, such that the driving unit stops outputting the control signal and the optical transmitting unit stops outputting the first optical signal.

3. The optical transceiver module according to claim 1, wherein the indicating element outputs the indicating signal to the driving unit through a pin of the connection unit.

4. The optical transceiver module according to claim 1, wherein the optical transmitting unit is a laser diode, and the optical receiving unit is a photo-detect diode.

5. The optical transceiver module according to claim 1, wherein the optical transceiver module is coupled to an optical fiber, the optical transmitting unit outputs the first optical signal through the optical fiber, and the optical receiving unit receives the second optical signal through the optical fiber.

6. The optical transceiver module according to claim 1, wherein the link device is an USB device.

7. An optical transmission device adapted to a first link device and a second link device, the optical transmission device comprising:
a first optical transceiver module, which is coupled to one end of an optical fiber, wherein the first optical transceiver comprises a first connection unit, a first driving unit, a first optical transmitting unit and a first optical receiving unit, the first connection unit is to be coupled with the first link device, and the first driving unit drives the first optical transmitting unit and the first optical receiving unit to output and receive optical signals through the optical fiber; and
a second optical transceiver module, which is coupled to the other end of the optical fiber and comprises:
a second connection unit to be coupled with the second link device and having an indicating element, which generates an indicating signal when the second connection unit is coupled with the second link device,
a second driving unit, coupled with the second connection unit, for receiving the indicating signal and outputting a control signal according to the indicating signal,
a second optical transmitting unit, coupled with the second driving unit, for receiving the control signal, which drives the second optical transmitting unit to output a first optical signal through the optical fiber, and
a second optical receiving unit, coupled with the second driving unit, for transmitting a second optical signal, received through the optical fiber, to the second driving unit.

8. The optical transmission device according to claim 7, wherein when the second connection unit is not coupled with the second link device, the indicating element does not generate the indicating signal, such that the second driving unit stops outputting the control signal and the second optical transmitting unit stops outputting the first optical signal.

9. The optical transmission device according to claim 7, wherein the indicating element outputs the indicating signal to the second driving unit through a pin of the second connection unit.

10. The optical transmission device according to claim 7, wherein each of the first optical transmitting unit and the second optical transmitting unit is a laser diode, and each of the first optical receiving unit and the second optical receiving unit is a photo-detect diode.

11. The optical transmission device according to claim 7, wherein the first link device is a host with a USB interface, and the second link device is an USB device.

12. An optical transmission method applied to an optical transmission device and adapted to a first link device and a second link device, the optical transmission device comprising an optical fiber, a first optical transceiver module and a second optical transceiver module, wherein the first optical transceiver module is coupled to the second optical transceiver module through the optical fiber, the second optical transceiver module comprises a second connection unit, a second driving unit, a second optical transmitting unit and a second optical receiving unit, and the second connection unit comprises an indicating element, the optical transmission method comprising the steps of:
providing a power to the second optical transceiver module;
generating, by the indicating element, an indicating signal to the second driving unit when the second connection unit is coupled with the second link device; and
outputting, by the second driving unit, a control signal through the optical fiber according to the indicating signal to drive the second optical transmitting unit to output a first optical signal to the first optical transceiver module.

13. The optical transmission method according to claim 12, further comprising a step of:
stopping generating, by the indicating element, the indicating signal to the second optical transmitting unit when the second connection unit is not coupled with the second link device, such that the second driving unit stops outputting the control signal and the second optical transmitting unit stops outputting the first optical signal.

14. The optical transmission method according to claim 12, further comprising the steps of:
receiving, by a first optical receiving unit of the first optical transceiver module, the first optical signal;
disabling, by the first optical transceiver module, a receiver loss of signal indication according to the first optical signal;
coupling with a differential terminal impedance of the first optical transceiver module when the receiver loss of signal indication is disabled; and
issuing a link training sequence when the first link device detects the differential terminal impedance of the first optical transceiver module, such that the first link device communicates with the second link device through the optical transmission device.

15. The optical transmission method according to claim 12, wherein the first link device is a host with a USB interface, and the second link device is an USB device.

* * * * *